United States Patent [19]

Whiting et al.

[11] Patent Number: 4,768,791
[45] Date of Patent: Sep. 6, 1988

[54] EXPANDABLE GRINDING PLUG

[75] Inventors: Kenneth A. Whiting; Vernon O. Whiting, both of Independence, Mo.

[73] Assignee: Whiting Custom Enterprises, Inc., Independence, Mo.

[21] Appl. No.: 104,411

[22] Filed: Oct. 5, 1987

[51] Int. Cl.⁴ .................. B23B 23/00; B23B 31/00
[52] U.S. Cl. .................... 279/2 R; 82/33 R; 82/44; 82/45; 279/1 R; 279/1 L
[58] Field of Search .............. 279/2 R, 41 R, 46 R, 279/1 R, 1 A, 1 L; 82/33, 34 A, 34 B, 44, 45

[56] References Cited

U.S. PATENT DOCUMENTS

| | | | |
|---|---|---|---|
| 1,384,187 | 7/1921 | Gagarin | 82/44 |
| 2,361,142 | 10/1944 | Zimmerman | 279/2 R |
| 2,383,036 | 8/1945 | Benjamin et al. | 82/44 |
| 2,459,453 | 1/1949 | Rieber | 279/2 R |
| 2,588,354 | 3/1952 | Buescher | 279/2 R |
| 2,621,053 | 12/1952 | Kane | 279/2 R |
| 2,869,412 | 2/1957 | Simon | 82/44 |
| 3,177,742 | 4/1965 | Basso | 82/33 R |
| 3,311,383 | 1/1965 | Cox | 279/2 R |
| 3,587,371 | 6/1971 | Sherwood | 279/2 R |
| 3,701,537 | 10/1972 | Rossman et al. | 279/1 A |
| 4,272,086 | 6/1981 | Tryon | 279/1 S |

FOREIGN PATENT DOCUMENTS 235200 4/1986 German Democratic Rep. ... 82/2.7

Primary Examiner—Gil Weidenfeld
Assistant Examiner—Daniel W. Howell
Attorney, Agent, or Firm—Hovey, Williams, Timmons & Collins

[57] ABSTRACT

A workpiece-holding plug has six sector-shaped segments that expand outwardly in a radial direction when in use and in contact with a lathe center. The segments have tapered outer wall portions which assume a precise cylindrical shape when the plug is expanded so that the central axis of the lathe center is maintained in precise concentric relationship to the central axis of the workpiece. The plug is of a particular construction which ensures that each of the segments shifts radially outwardly an equal distance, and yet has sufficient resiliency for self-contraction when the work operation is completed so that the plug may be readily removed from the workpiece. The plug has particular utility for holding a press roller on a lathe during reconditioning of the outer rubber surface of the roller.

5 Claims, 1 Drawing Sheet

EXPANDABLE GRINDING PLUG

BACKGROUND OF THE INVENTION

1. Field of the Invention

The present invention broadly relates to an expandable mandrel or plug especially adapted to securely hold a rubber surfaced roller of a printing press on a lathe in accurate, precise alignment with centers of the same so that the rubber surface of the roller can be ground to dimensions within extremely close tolerances. More particularly, the invention concerns a grinding plug formed of a body having resilient, sector-shaped segments which flex outwardly to engage an interior wall of the press roller; the body is of a particular configuration which ensures that all of the segments shift an equal distance during flexing to maintain the central axis of the lathe centers in perfect alignment with the longitudinal axis of the roller.

2. Description of the Prior Art

Rubber-surfaced rollers of a printing press must be reconditioned from time to time after periods of extended use. In normal practice, the roller is removed from the press and sent to a reconditioning facility where the old and worn rubber material surrounding the metallic roller is removed. Next, a new section of rubber is affixed to the metal cylinder by glue or other means.

However, special precautions must be taken to ensure that the outer surface of the rubber is in the shape of a true cylinder that is concentric with the central axis of the roller. To this end, the roller is typically mounted on a lathe and the outer surface of the new rubber section is ground to a smooth cylindrical configuration. Press manufacturers often specify, in this regard, that the finished rubber outer surface should be concentric with inner cylindrical walls of the roller which normally receive the roller bearings to a dimension of 0.001 inch.

In accordance with conventional practice, bearings within the printing press rollers are often replaced at the same time that the rubber rollers are taken out of service for resurfacing. Consequently, the rollers are shipped to the reconditioning facility without bearings, and personnel at the reconditioning facility must then press in new bearings compatible with the lathe so that the roller may be held in alignment with the centers of the lathe. Once the resurfacing operation is completed, the bearings are then removed by a second pressing operation before the roller is returned to the location where the printing press is in service. As can be appreciated, the steps in pressing in and pressing out of temporary bearings for supporting the roller during the resurfacing and machining process represent an expenditure which significantly increases the overall cost of the reconditioning operation accordingly.

As a result, it would be a desirable advance in the art to provide a device which could be readily inserted by hand into the hollow ends of a printing press roller, and yet would be operable to securely hold the roller without slippage once mounted on centers of a lathe. Moreover, and of equal importance, is the need for such a device to securely retain the longitudinal axis of the cylinder in precise alignment with the centers of the lathe, so that tolerances of less than 0.001 inch during machining of the outer rubber surface can be achieved.

SUMMARY OF THE INVENTION

Our present invention overcomes the above-noted disadvantages by provision of a grinding plug which normally assumes a configuration smaller than the inner diameter of the hollow ends of a press roller, yet is expandable once mounted on a lathe to cause arcuate wall portions of the plug to shift toward a position of firm contact with the inner wall of the roller. The plug is comprised of a particular material having a specific configuration which has been found to reliably cause each of the arcuate, workpiece engaging outer wall portions to assume the shape of a true cylinder in precise alignment with the longitudinal axis of the press roller when the latter is mounted on a lathe and the lathe centers are in firm contact with the plug.

In a preferred embodiment of the invention, the plug is comprised of a base section, six identically shaped workpiece engaging segments each having the configuration of a sector, and six finger portions which integrally interconnect a respective one of the workpiece-engaging segments to the base section. Each segment has an inner, arcuate, tool engaging wall portion, and the portions together present a frustroconical recess that is adapted to receive the center of the lathe. When the plug is inserted into one end of the roller, the lathe center when received in the recess exerts an equal force on each of the segments to thereby flex the same outwardly an equal distance and cause the arcuate outer wall portions of the segments to securely grip an interior wall of the roller.

In accordance with the principles of the present invention, the plug is comprised of a spring steel material that is heat treated to provide sufficient resiliency to enable the segments to readily flex outwardly when in use. Slots separating the segments and the corresponding finger portions from adjacent segments and finger portions extend into the plug body a sufficient amount to enable proper, outwardly-directed flexing of each segment an equal distance, while ensuring that the plug body has sufficient resiliency to reliably cause the segments to return to its normal, somewhat smaller configuration so that the plug can be easily removed from the press roller at the end of the work operation.

As a consequence, the expandable plug of our present invention represents an especially effective means for mounting a press roller on a lathe when the roller is provided with a new rubber surface and the surface must be machined with precise tolerances to an exact cylindrical configuration. The plugs can be easily inserted without the use of a press or the like in the bearing cavity of the roller, and can also be quickly removed once the machining operation is completed. Thus, labor costs are significantly lower than the expenses that would be normally incurred by following conventional practice.

DETAILED DESCRIPTION OF THE DRAWINGS

Figure 1:
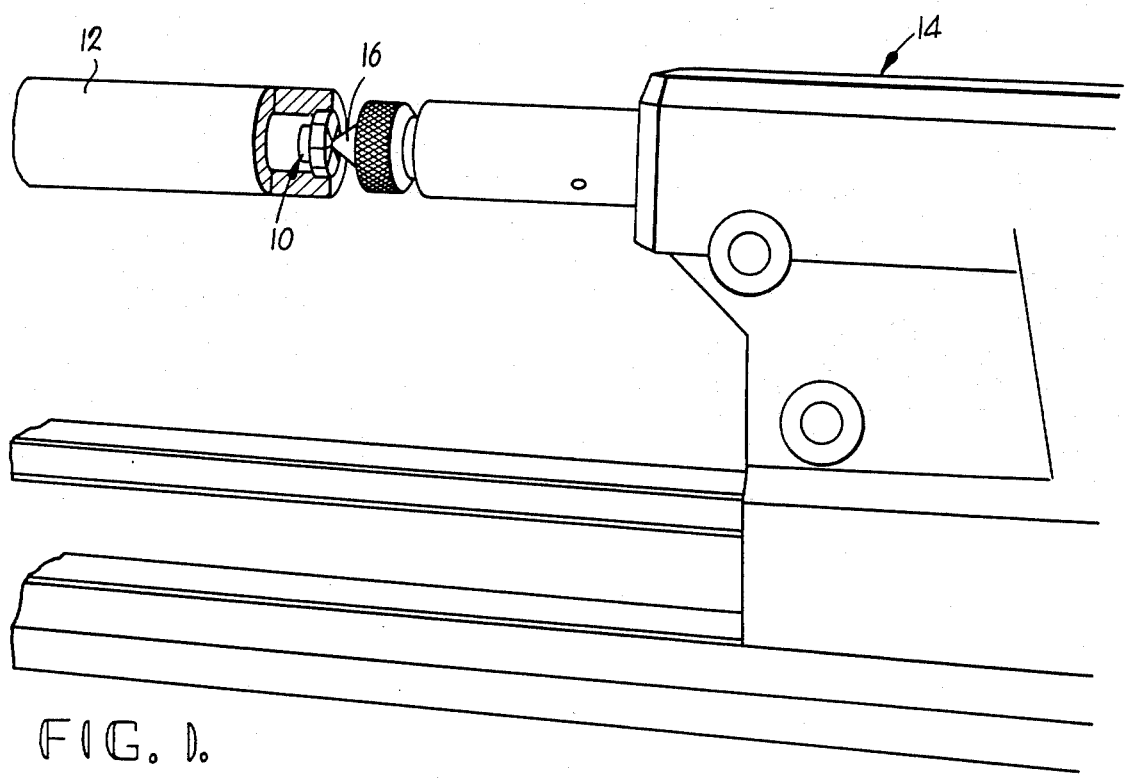
FIG. 1 is a fragmentary, perspective view of a lathe having a center in engagement with a plug constructed in accordance with the principles of the present invention, and wherein the plug is received in a cavity of a hollow press roller which has been cut away for clarity.

An expandable plug of the present invention is designated broadly by the numeral 10 and is illustrated in FIGS. 1–5. In FIG. 1, the plug 10 is shown in its use position within a cavity of a hollow cylindrical workpiece such as a press roller 12. A lathe 14 is provided with a center 16 which engages the plug 10 for holding the roller 12 during a machining operation.

Referring to FIGS. 2–5, the plug in more detail is comprised of an integral body that is preferably constructed from a resilient, heat treated spring steel material. The body 12 includes a cylindrical base section 20 (FIGS. 3–5) and six sector-shaped finger portions 22 which assume the overall configuration of a cylinder equal in diameter of base section 20.

Each of the finger portions 22 is connected to a corresponding one of six sector-shaped workpiece engaging segments 24. Each of the segments 24 presents an outer arcuate workpiece-engaging wall portion 26 which is normally tapered radially inwardly as the end of the plug 10 opposite from base section 20 is approached.

Figure 3:
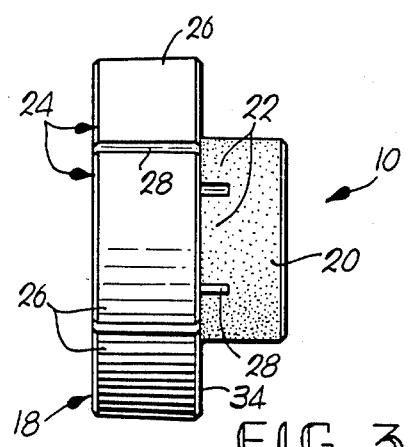
FIG. 3 is an enlarged, right side elevational view of the plug depicted in FIGS. 1 and 2 and illustrating the normally tapered orientation of the arcuate wall portions of each segment.
Figure 4:
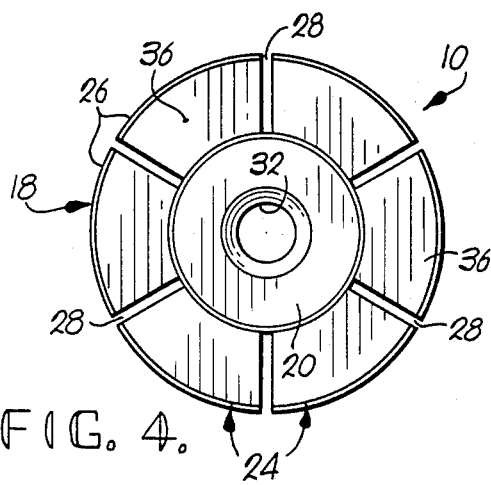
FIG. 4 is a view similar to FIG. 2 depicting the rear side thereof.
Figure 5:
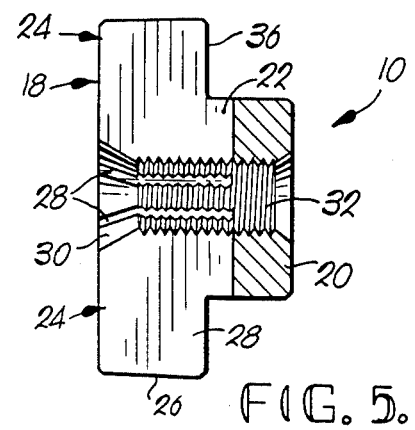
FIG. 5 is an enlarged, side cross-sectional view of the plug illustrated in FIGS. 1–4 and showing a frustroconical recess for receiving a lathe center.

As perhaps best understood by reference to FIGS. 3 and 5, the six segments 24 are tapered somewhat and are arranged to normally present a frustroconical configuration, with the base of the cone being adjacent the finger portions 22.

Figure 2:
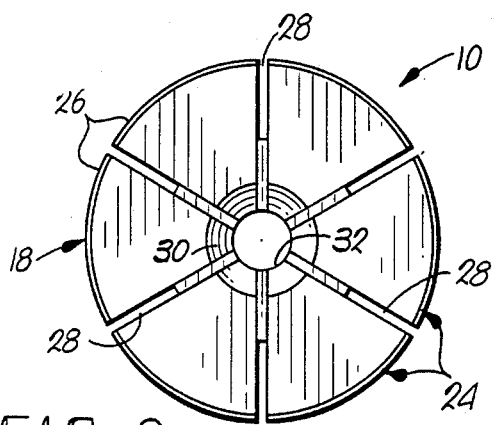
FIG. 2 is an enlarged, front elevational view of the plug shown in FIG. 1 and illustrating the configuration of six sector-shaped workpiece engaging segments that are shiftable outwardly to engage the inner walls of the press roller.

Viewing FIG. 2, each of the sector-shaped segments 24 is separated from adjacent segments 24 by slots 28 that also separate the corresponding finger portion 22 from adjacent finger portions 22. The slots 28 extend radially from the central axis of the plug 10 at 60° intervals so that each of the segments 24 are of identical shape. The slots 28 terminate at the beginning of the base section 20, as can be seen by reference to FIGS. 3 and 5.

Each of the sector-shaped segments 24 also includes an arcuate, tool-engaging inner wall portion 30 that is shown in FIGS. 2 and 5. The six wall portions 30 are arranged in the precise shape of a truncated cone that is complemental in configuration to the shape of the lathe center 16. The cone defined by the inner wall portions 30 has a central axis coaxial with the body 18, including the central axis of base section 20, and the cone is tapered in a direction opposite to the normal taper of the outer wall portions 26.

A bore 32 extends along the central axis of plug 10 inwardly from the end of the tapered inner wall portions 30. The bore 32 is defined by inner wall surfaces of the six sector-shaped segments 24 and the six corresponding, sector-shaped finger portions 22, and the wall surfaces present threads as can be visualized in FIG. 5. The threads are normally not used, but may be useful in certain circumstances where the plug 10 is stuck and must be removed by engaging a complementally threaded removal tool with the threads of bore 32.

Finally, each of the sector-shaped segments 24 includes a flat wall surface 34 adjacent the corresponding finger portion 22 and disposed in a direction radially outwardly from the same. Each of the flat wall surfaces 34 lie in a common plane that is perpendicular to the central axis of body 18.

In use, the plug 10 is inserted by hand in a bearing cavity of the press roller 12. The bearing cavity is somewhat larger in diameter than the diameter of the bore which extends through the remaining reaches of the roller 12, and the plug 10 is inserted into the bearing cavity until the flat wall surfaces 34 come into a position of abutting contact with a flanged wall that separates the bearing cavity from the central bore of roller 12.

Next, the roller 12 with plug 10 is brought into a position of general alignment with the center 16 of lathe 14, and the center 16 is then advanced toward the frustroconical recess defined by the inner wall portions 30 of segments 24. As the center 16 contacts each of the complementally-configured inner wall portions 30, the roller 12 shifts laterally as may be needed to bring the central axis of the plug 10 into alignment with the central axis of lathe center 16.

Subsequently, the center 16 is further urged in a direction toward the roller 12, which causes each of the sector-shaped segments 24 to shift outwardly away from the central axis of body 18. Further advancement of the center 16 causes each outer wall portion 26 to move toward a position of firm engagement with the inner wall of the press roller 12 defining the bearing cavity with sufficient force to prevent slippage of the roller 12 relative to the lathe 14. As a consequence, the outer rubber surface of the press roller 12 may then be subjected to a grinding or other type of machining operation as may be desired.

The particular nature of the plug 10, including the configuration of the finger portions 22 and the segments 24, ensures that each of the segments 24 will shift outwardly an equal distance when influenced by the pressure of lathe center 16. As a result, each of the arcuate outer wall portions 26 of the respective segment 24 is brought into a position of firm contact with a corresponding region of the bearing cavity.

Moreover, as each of the segments 24 shifts outwardly, each of the outer wall portions 26 moves equally away from the central axis of plug 10 so that the latter is concentric with the central axis of the bearing cavity as well as the outer surface of the press roller 12. Consequently, the central axis of the lathe center 16 is precisely maintained in coaxial relationship to roller 12, so that the machining operation can be carried out under relatively small tolerances such as 0.001 inch as may be necessary to meet the specifications of the printing press.

Once the resurfacing operation is completed, the lathe operator backs off the center 16 for movement in a direction away from the base section 20. The inherent resiliency of the material comprising the body 18 simultaneously causes each of the segments 24 to shift inwardly toward their normal configuration as shown in FIGS. 2–5. As a consequence, each of the arcuate outer wall portions 26 moves away from the inner wall defining the bearing cavity of roller 12, and the plug 10 may then be readily removed by hand from the bearing cavity of roller 12.

In one example, the body 18 was constructed such that the outer wall portions 26 each had a taper of 0.005 inch in their normal, unflexed orientation. That is, the radius of each segment 24 from the central axis of plug 10 was 0.005 inch greater along the flat wall surfaces 34 than the radius of the flat walls on the opposite end of segments 24. This example was found to provide extremely satisfactory results, with the inherent resiliency of the material comprising the body 18 being sufficient to enable the plug 10 to be readily removed from the roller 12 at the end of the resurfacing operation.

Those skilled in the art can recognize, of course, that various modifications and additions can be made to the particularly preferred embodiment shown for the purpose of illustrating the invention without departing from the gist and essence of my contribution to the art. Consequently, the invention should be deemed to be limited only by a fair scope of the claims which follow, along with the mechanical equivalents thereof.

We claim:

1. An expandable plug for use in the machining of a hollow cylindrical workpiece comprising:

a body having a generally cylindrical base section, a certain number of sector-shaped finger portions, and a plurality of sector-shaped workpiece-engaging segments equal in number to said certain number, said finger portions being generally arranged in the overall shape of a cylinder disposed in concentric relationship to said base section, each of said finger portions integrally interconnecting said base section and a corresponding one of said segments, said segments each including an arcuate outer wall portion normally tapered in a radially inwardly direction, said wall portions together normally having a frustro-conical configuration larger in diameter than said base section and disposed in concentric relationship to the latter, said workpiece-engaging segments each having an arcuate, tool-engaging wall portion, said tool engaging portions together presenting a recess in the shape of a truncated cone having a central axis that is coaxial with said base section, said truncated cone being tapered in a direction opposite to the direction of taper of the frustroconical configuration presented by said workpiece engaging segments, each of said segments presenting respective flat wall surfaces that lie in a common plane adjacent said finger portions and generally perpendicular to said central axis for abutting contact with an inner flange of the hollow workpiece, said body being comprised of a resilient material for enabling radially outwardly flexing of each of said workpiece-engaging segments when said wall surfaces are in abutting contact with said flange and when a tool received in said recess exerts a force in a direction toward said base section, said outer wall portions of said segments when flexed outwardly lying in a true reference cylinder that is concentric with said central axis for securely gripping the workpiece during machining thereof.

2. The invention as set forth in claim 1, wherein said material comprising said body consists of heat treated spring steel.

3. The invention as set forth in claim 1, there being six workpiece-engaging segments each of substantially identical configuration.

4. The invention as set forth in claim 1, wherein each of the finger portions are completely separate from adajacent portions and are separated from the same by slots extending in respective planes that extend through said central axis, said slots also separating corresponding segments from adjacent segments.

5. The invention as set forth in claim 1, wherein said body further includes structure defining a threaded bore extending along said central axis for selective engagement with a plug-removing tool.

* * * * *